(12) United States Patent

Skawski

(10) Patent No.: US 12,668,923 B2
(45) Date of Patent: Jun. 30, 2026

(54) THROUGH-AIR APPARATUS WITH A SHROUD

(71) Applicant: Valmet AB, Sundsvall (SE)

(72) Inventor: Jan Skawski, Wilton, ME (US)

(73) Assignee: Valmet AB, Sundsvall (SE)

( * ) Notice: Subject to any disclaimer, the term of this patent is extended or adjusted under 35 U.S.C. 154(b) by 232 days.

(21) Appl. No.: 18/584,302

(22) Filed: Feb. 22, 2024

(65) Prior Publication Data

US 2025/0270763 A1     Aug. 28, 2025

(51) Int. Cl.
| | |
|---|---|
| *B32B 41/00* | (2006.01) |
| *B32B 37/00* | (2006.01) |
| *D21F 5/18* | (2006.01) |
| *F26B 13/16* | (2006.01) |
| *F26B 25/00* | (2006.01) |

(52) U.S. Cl.
CPC .......... *D21F 5/182* (2013.01); *B32B 37/0046* (2013.01); *D21F 5/181* (2013.01); *F26B 13/16* (2013.01); *F26B 25/008* (2013.01)

(58) Field of Classification Search
CPC ..... D21F 5/182; D21F 5/181; B32B 37/0046; F26B 13/16; F26B 25/008
USPC ................... 156/60, 64, 350, 351, 378, 379
See application file for complete search history.

(56) References Cited

U.S. PATENT DOCUMENTS

| | | | | |
|---|---|---|---|---|
| 4,364,185 A | * | 12/1982 | Dussourd ................ | D21F 5/182 34/115 |
| 5,515,619 A | | 5/1996 | Kahl et al. | |

| | | | |
|---|---|---|---|
| 10,914,035 B1 | | 2/2021 | Seymour et al. |
| 2003/0115773 A1 | | 6/2003 | Lin |
| 2022/0380979 A1 | | 12/2022 | Shekhter et al. |

FOREIGN PATENT DOCUMENTS

| | | |
|---|---|---|
| DE | 1045351 B | 4/1958 |
| DE | 2640571 A1 | 3/1978 |
| DE | 2832840 A1 | 2/1979 |
| DE | 3213118 A1 | 11/1982 |

(Continued)

OTHER PUBLICATIONS

International Search Report and Written Opinion of the International Searching Authority for International Application No. PCT/EP2024/080841 mailed Jan. 30, 2025, 15 pages.

*Primary Examiner* — Michael N Orlando
*Assistant Examiner* — Joshel Rivera
(74) *Attorney, Agent, or Firm* — Pierce Atwood LLP

(57) ABSTRACT

A through-air apparatus for drying or bonding paper, tissue, or nonwoven webs is provided. The through-air apparatus includes a through-air roll configured for rotational movement about a first axis, the through-air roll having a first end and a second end. The through-air apparatus includes an exhaust duct/passage adjacent to the first end of the through-air roll, and a hood encompassing a portion of the through-air roll, where the hood defines an active arc length of the through-air roll positioned inside of the hood. The through-air apparatus further includes a first shroud extending substantially from the exhaust duct to the hood, the first shroud configured to reduce the amount of process air inside of the through-air apparatus that is released out of the through-air apparatus and reduce the amount of air outside of the apparatus that leaks into the through-air apparatus.

26 Claims, 13 Drawing Sheets

(56)     References Cited

FOREIGN PATENT DOCUMENTS

| DE | 4033901 | A1 | 4/1992 |
| DE | 4314475 | A1 | 12/1993 |
| JP | S57176291 | A | 10/1982 |
| WO | 2005068712 | A2 | 7/2005 |
| WO | 2022081257 | A1 | 4/2022 |
| WO | 2022254252 | A1 | 12/2022 |

* cited by examiner

TEND SIDE     PRIOR ART     DRIVE SIDE

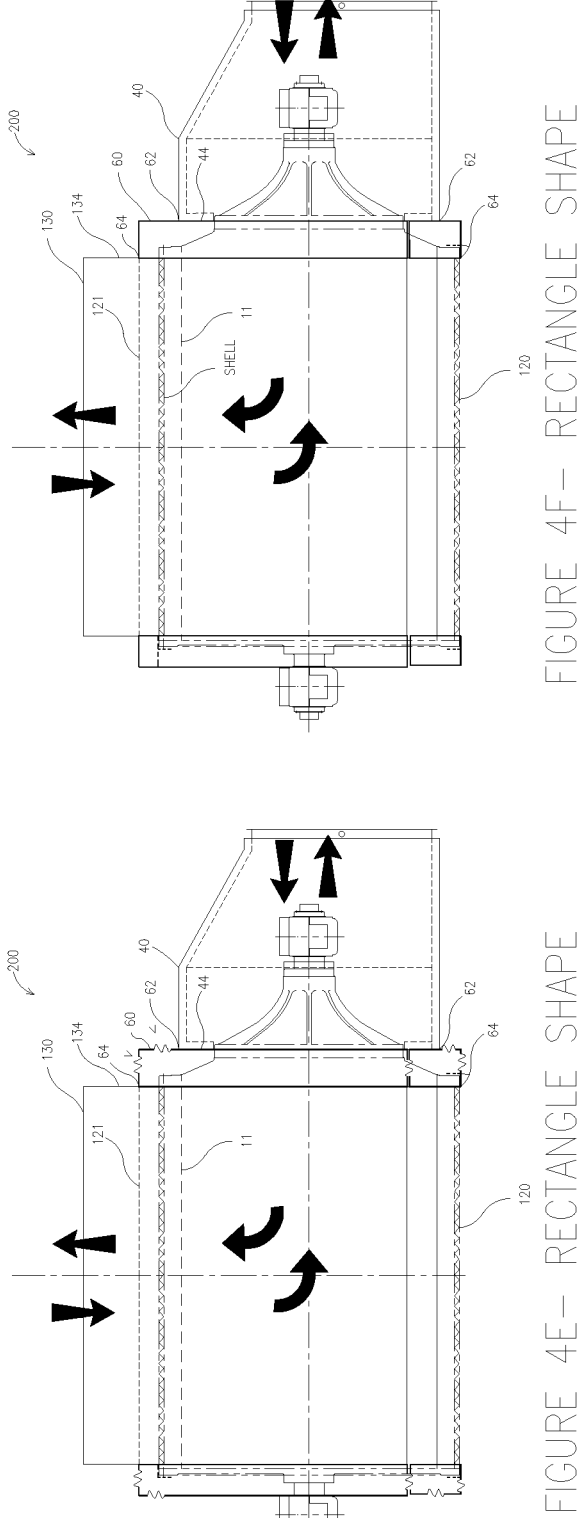
FIGURE 4F— RECTANGLE SHAPE
FIGURE 4E— RECTANGLE SHAPE

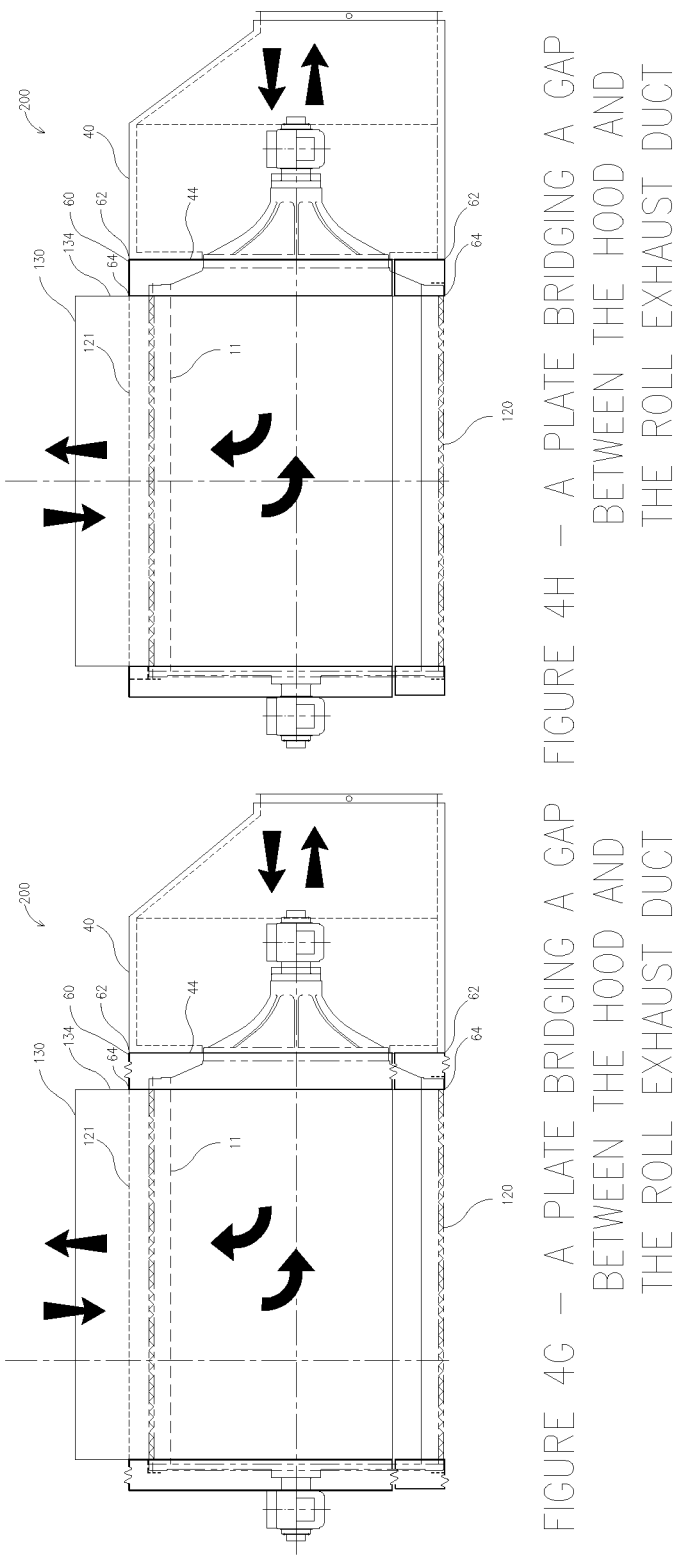
FIGURE 4H — A PLATE BRIDGING A GAP
BETWEEN THE HOOD AND
THE ROLL EXHAUST DUCT
FIGURE 4G — A PLATE BRIDGING A GAP
BETWEEN THE HOOD AND
THE ROLL EXHAUST DUCT

CASE 1: GAP PRESSURE "POSITIVE"
HOOD TO EXHAUST DUCT RADIAL SET UP

CASE 2: GAP PRESSURE "NEGATIVE"
HOOD TO EXHAUST DUCT RADIAL SET UP

DEAD ZONE WITH THE EXHAUST DUCT AT
HOOD ENTRANCE & EXIT SEALS/SKIRTS
RADIAL AND CROSS MACHINE SET UP
WITHOUT AUGMENTED AIR

DEAD ZONE WITH THE EXHAUST DUCT
BETWEEN ENTRANCE AND EXIT SEALS/SKIRTS
RADIAL AND CROSS MACHINE SET UP
WITHOUT AUGMENTED AIR

DEAD ZONE WITH THE EXHAUST DUCT
HOOD ENTRANCE & EXIT SEALS
RADIAL AND CROSS MACHINE SET UP
WITH AUGMENTED AIR FOR ROLL END DAM SEAL

DEAD ZONE WITH THE EXHAUST DUCT
BETWEEN ENTRANCE & EXIT SEALS
RADIAL SEALS MACHINE SET UP
WITH AUGMENTED AIR FOR ROLL END DAM SEAL

DEAD ZONE WITH SINGLE END EXHAUST
RADIAL SEALS MACHINE SET UP
WITH AUGMENTED AIR FOR ROLL END DAM SEAL

DEAD ZONE WITH THE EXHAUST DUCT
HOOD ENTRANCE & EXIT SEALS
RADIAL AND CROSS MACHINE SET UP
WITH AUGMENTED AIR FOR ROLL END DAM SEAL

DEAD ZONE WITH THE EXHAUST DUCT
HOOD ENTRANCE & EXIT SEALS
RADIAL AND CROSS MACHINE SET UP
WITH AUGMENTED AIR FOR ROLL END DAM SEAL

SYSTEM SCHEMATIC WITH EXHAUST FAN

SYSTEM SCHEMATIC WITHOUT EXHAUST FAN

SYSTEM SCHEMATIC WITH EXHAUST FAN BURNER BEFORE MAIN FAN

THROUGH-AIR APPARATUS WITH A SHROUD

FIELD OF THE INVENTION

The invention relates to a through-air apparatus for manufacturing web products directed to improving the system thermal efficiency.

BACKGROUND

"Through air technology" is a term used to describe systems and methods enabling the flow of air through a paper, tissue, or nonwoven web for the purpose of drying or bonding fibers or filaments. Examples include the drying of nonwoven products (e.g., tea bags and specialty papers); drying and curing of fiberglass mat, filter paper, and resin-treated nonwovens; thermobonding and drying of spunbond nonwovens; drying hydroentangled webs; thermobonding geotextiles with or without bicomponent fibers; drying and curing interlining grades; and thermobonding absorbent cores with fusible binder fibers. The drying of tissue paper is also another application of through air technology.

Systems and methods related to through-air drying are commonly referred to with the use of the "TAD" acronym. Systems and methods related to through-air bonding are commonly referred to with the use of the "TAB" acronym.

A through-air apparatus generally includes a rigid air-permeable web-carrying structure, also known as a through-air roll. A web is placed on the through-air roll, and as the through-air roll rotates, a fan may blow/pull air through the wall of the through-air roll to treat the web, depending upon the fan orientation. The through-air roll typically has a plurality of openings to permit the air to pass through the structure.

SUMMARY OF THE INVENTION

According to a first aspect of the present disclosure, through-air apparatus for drying or bonding paper, tissue, or nonwoven webs is provided. The apparatus includes a through-air roll configured for rotational movement about a first axis, the through-air roll having a first end and a second end. The apparatus also includes an exhaust duct adjacent to the first end of the through-air roll, a hood encompassing a portion of the through-air roll, where the hood defines an active arc length of the through-air roll positioned inside of the hood, and a first shroud extending substantially from the exhaust duct to the hood. The first shroud is configured to reduce the amount of process air inside of the through-air apparatus that is released out of the through-air apparatus and reduce the amount of air outside of the apparatus that leaks into the through-air apparatus.

BRIEF DESCRIPTION OF THE DRAWINGS

FIGS. 4A-4H are detailed cross-sectional views and end views of a through-air apparatus according to various embodiments;

DETAILED DESCRIPTION

The present disclosure is directed to a through-air apparatus configured to manufacture various products, such as paper, tissue, and/or nonwoven webs. One of ordinary skill in the art would recognize that the through-air apparatus may be configured as a through-air dryer (TAD) and/or a through-air bonder (TAB), depending on the context in which the apparatus is used. One of ordinary skill in the art will also recognize that the through-air apparatus may be used to make various web products that are rolled in their finished end product form. It should also be recognized that the product may not be rolled and/or may be cut into a finished end product. Furthermore, one of ordinary skill in the art will recognize that the through-air apparatus may be configured to make various products, including, but not limited to various films, fabric, or other web type material, and the apparatus may be used for various processes that may include mass transfer, heat transfer, material displacement, web handling, and quality monitoring, including, but not limited to drying, thermal bonding, sheet transfer, water extraction, web tensioning, and porosity measurement.

As set forth in more detail below, the through-air apparatus includes a rigid air-permeable through-air roll configured for rotational movement about a first axis. A web is placed on the through-air roll, and as the web moves, a fan may blow/pull air through the wall of the through-air roll to treat the web, depending upon fan orientation. The through-air roll typically has a plurality of openings to permit the air to pass through the roll. It should be appreciated that the below described embodiments may be incorporated into various types of through-air apparatus configurations that employ through-air rolls that are configured for rotational movement, as the disclosure is not limited in this respect.

In one embodiment, a web (i.e., product) is typically in a sheet-form and it is partially wrapped around a cylindrical shell (i.e., through-air roll) of the through-air apparatus. The web is wrapped about a portion of the roll ranging from, for example, 90° to 360°, and typically between 180°-300° around the roll. The cylindrical wall of the through-air roll typically has a plurality of openings configured for air to pass through. A fan/blower is used to circulate the air across the product, and the through-air roll is typically positioned within a hood to optimize the air flow characteristics. As the product travels with the rotating roll through the active zone of the apparatus, the fan/blower circulates air through the wall of the cylindrical shell to treat the product. A heater may be provided so that heated air circulates through the through-air roll.

Figure 1:
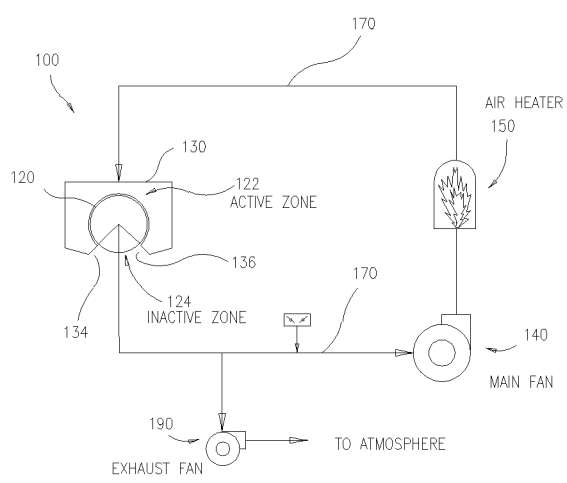
FIG. 1 is a schematic diagram of a conventional through-air apparatus system.

A conventional through-air apparatus system diagram is illustrated in FIG. 1. As shown, the through-air apparatus 100 includes a though-air roll 120 that is configured to rotate within a hood 130. The system includes a main fan 140 that directs system air (also known as process air) through conduit 170 and into hood 130 and then draws the air into the through-air roll 120. As shown, an air heater 150 may also be coupled to the conduit 170 to direct heated air into the through-air roll 120. The system may also include an exhaust fan 190 to draw air out of the apparatus 100 through conduit 170 to vent to atmosphere. As shown in FIG. 1, there is a closed loop of system air that flows from the main fan 140 through the conduit 170, into the hood 130, through the through-air roll 120, out an exhaust duct and through conduit 170. It should be appreciated that in another embodiment, the through-air apparatus may be a single pass system where the system air may not be recirculated in a loop. Furthermore, it is also contemplated that in another embodiment, the through-air apparatus may be configured so that the heated air is supplied from a different heat source as the present disclosure is not so limited. Other through-air apparatus system configurations are discussed in more detail below.

A through-air apparatus 100 is typically a very large machine. For example, the through-air roll 120 may have a length between 1 foot-30 feet, and a diameter between 1 foot-22 feet. The cylindrical wall of the roll 120 may be formed of an open rigid structure to permit the flow of air therethrough. In one embodiment, the through-air roll 120 may be a HONEYCOMB ROLL® obtained from Valmet, Inc.

The through-air apparatus 100 has an active air flow zone which is configured to receive the system air to treat the web. As shown in FIG. 1, this active air flow zone 122 is defined, in part, by the portion of the through-air roll 120 that is configured to receive the web product (and also defined by the portion of the through-air roll 120 positioned within the hood 130). As also shown in FIG. 1, the through-air apparatus also has an inactive air flow zone 124 which is defined, in part, by the portion of the through-air roll 120 that is not configured to receive the web product nor the process airflow. As set forth in more detail below, these active and inactive zones 122, 124 may vary depending upon on how the web is wrapped around the through-air roll 120. It should be appreciated that when the through-air roll 120 is configured to rotate in a clockwise direction, the hood entrance may be defined at 134 and the hood exit may be defined at 136 (see FIG. 1).

The inventors recognized problems associated with the conventional through-air apparatus 100. In particular, the inventors recognized that there was (1) an undesirable amount of process air inside of the through-air apparatus 100 that is released out of the through-air apparatus 100; and (2) an undesirable amount of ambient air outside of the apparatus 100 that leaks into the through-air apparatus 100. As set forth in more detail below, there is typically a space, or a gap between the through-air roll 120 and adjacent components of the through-air apparatus 100 to enable movement of the web-carrying through-air roll. This gap is generally between about 0.06 inches-8.0 inches. Furthermore, hood seals may be provided, and they may be set with 0.05-0.50 inch in clearances. One or more sealing elements (discussed below) may be provided on these adjacent components to reduce in-leak of ambient air. Nevertheless, infiltration of ambient air into the through-air apparatus and process air releasing outside of the through-air apparatus still occurs in these locations. The inventors recognized that currently there is a limitation on how small the seal clearances can be set due to several factors, such as, the through-air roll size, width, operating vacuum, rotation speed, manufacturing tolerances as well as thermal expansion loads, roll deflection, and other forces. As set forth in more detail below, aspects of the present disclosure are directed to reducing and controlling this undesirable movement of air both into and out of the through-air apparatus, thus improving the system thermal efficiency.

Figure 2:
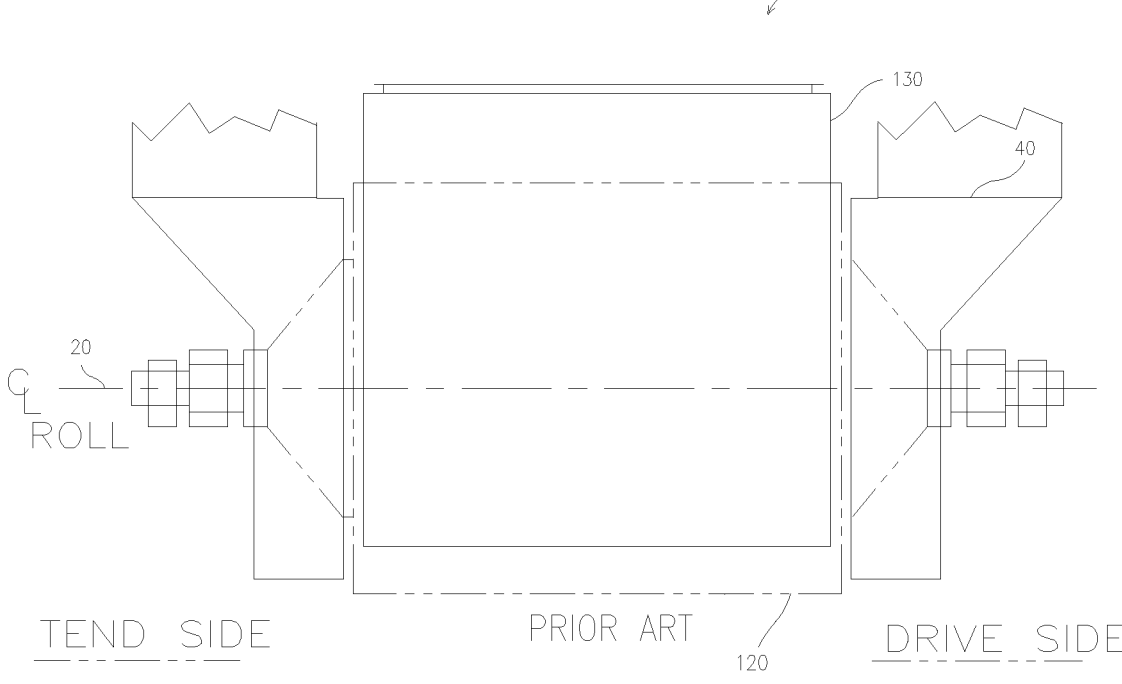
FIG. 2 is a cross-sectional view of a prior art conventional through-air apparatus.

FIG. 2 is a cross-sectional view of a conventional through-air apparatus 100. As shown, a through-air roll 120 is configured for rotational movement about a first axis 20. An exhaust duct 40 is adjacent to one end of the through-air roll 120, and hood 130 encompasses a portion of the through-air roll 120. As shown best in FIG. 1, the hood 130 defines an active arc length of the through-air roll 120 positioned inside of the hood 130. In a conventional through-air apparatus, both the exhaust duct 40 and the hood 130 are stationary relative to the rotating through-air roll 120. Furthermore, in a conventional apparatus 100, both the hood 130 and the exhaust duct 40 have non-contact sealing elements which means that there is a gap between the stationary component (i.e., the exhaust duct 40 or the hood 130) and the rotating through-air roll 120. This gap acts as a passage for ambient air to enter the system when operating under a vacuum, or for process air to escape the system when operating under pressure. Applicant recognized that ambient air entering the system requires heat and/or energy to bring it to the process temperature, and escaped process air creates heat/energy loss to the surrounding environment. In both scenarios, energy is lost.

As set forth in more detail below, aspects of the present disclosure are directed to capturing escaping hot process air and/or preventing ambient air from entering the system. Applicant recognized that the resulting through-air apparatus may be (1) safer to personnel; and (2) save energy thereby improving the system thermal efficiency.

As set forth in more detail below, aspects of the present disclosure include a through-air apparatus 200 which includes a shroud 60 extending substantially from the exhaust duct 40 to the hood 130, where the shroud 60 is configured to reduce the amount of process air inside of the through-air apparatus 200 that is released out of the through-air apparatus and reduce the amount of air outside of the apparatus that leaks into the through-air apparatus.

Figures 3A, 3B:
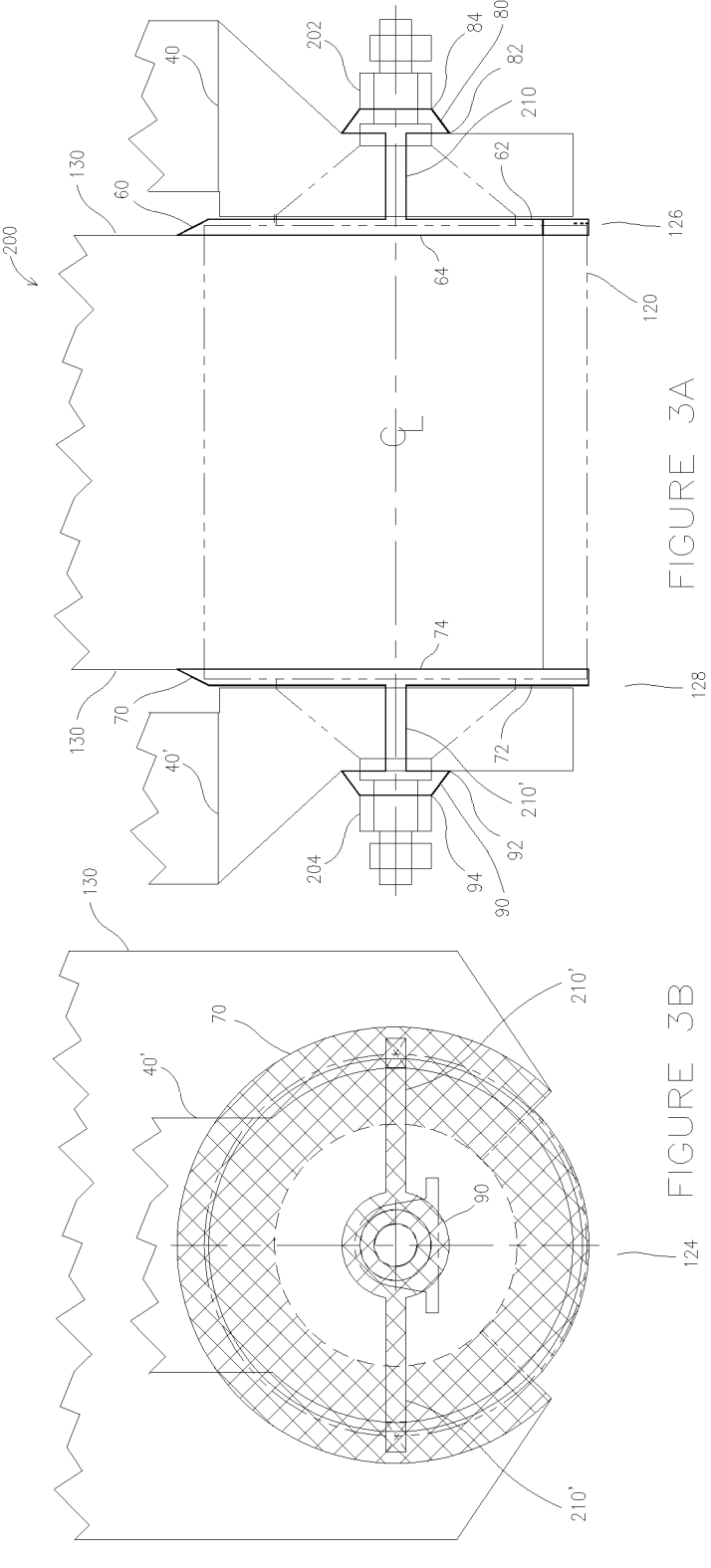
FIG. 3A is a cross-sectional view of a through-air apparatus according to one embodiment.
FIG. 3B is an end view of the through-air apparatus shown in FIG. 3A.

Turning now to FIGS. 3A and 3B, one embodiment of a through-air apparatus 200 having a first shroud 60 will now be described. FIG. 3A illustrates a cross-sectional view and FIG. 3B illustrates an end view. As shown, a first shroud 60 is positioned on a first end 126 of the through-air roll 120, and the first shroud 60 extends substantially from the exhaust duct 40 to the hood 130. As discussed above and as shown in FIG. 2, in a conventional through-air apparatus, this area is typically open and thus accounts for ambient air to enter into the system and/or for process air to leak/escape out of the system. In contrast, the first shroud 60 is shaped and configured to envelope and/or enclose the area between the exhaust duct 40 and hood 130 on the first end 126 of the through-air roll 120.

The Applicant has contemplated a variety of different shapes and materials for the shroud 60, many of which are discussed in further detail below. As shown in FIG. 3A, in one particular embodiment, the first shroud 60 has a substantially truncated cone shape, with a smaller first end 62 of the first shroud 60 adjacent the exhaust duct 40 and a larger second end 64 adjacent the hood 130. In one embodiment, the shroud 60 may have a canted shape analogous to an Elizabethan collar designed for a pet. It should be appreciated that the specific size and shape of the shroud 60 may vary based upon the size and shape of the exhaust duct/ passage 40 and hood 130 as well as the geometry and limitations in the physical space. Various shaped shrouds 60 are discussed in more detail below. In one embodiment, the shroud 60 acts as a flange or skirt positioned between the exhaust duct 40 and the hood 130.

In one embodiment, the first shroud 60 may be configured to extend radially about at least the active arc length of the through-air roll 120 (i.e., active zone of the apparatus). As discussed above, the hood 130 defines an active arc length of the through-air roll 120 as the arc length of the through-air roll 120 positioned inside of the hood 130. In one embodiment, the active arc length is between for example, 90° to 360°, and typically between 180°-300°. As set forth in more detail below, it should also be appreciated that in other embodiments, the first shroud 60 may be configured differently.

Figures 4A, 4B:
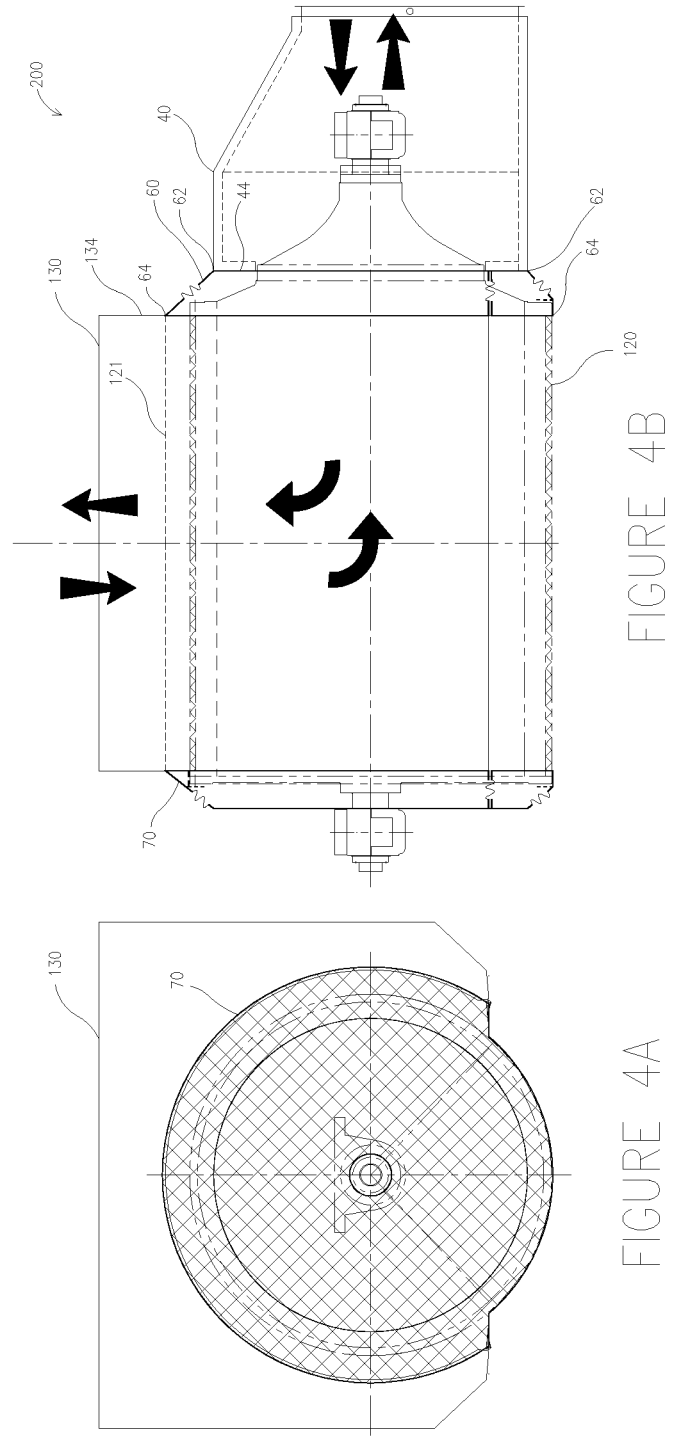
Figures 4C, 4D:
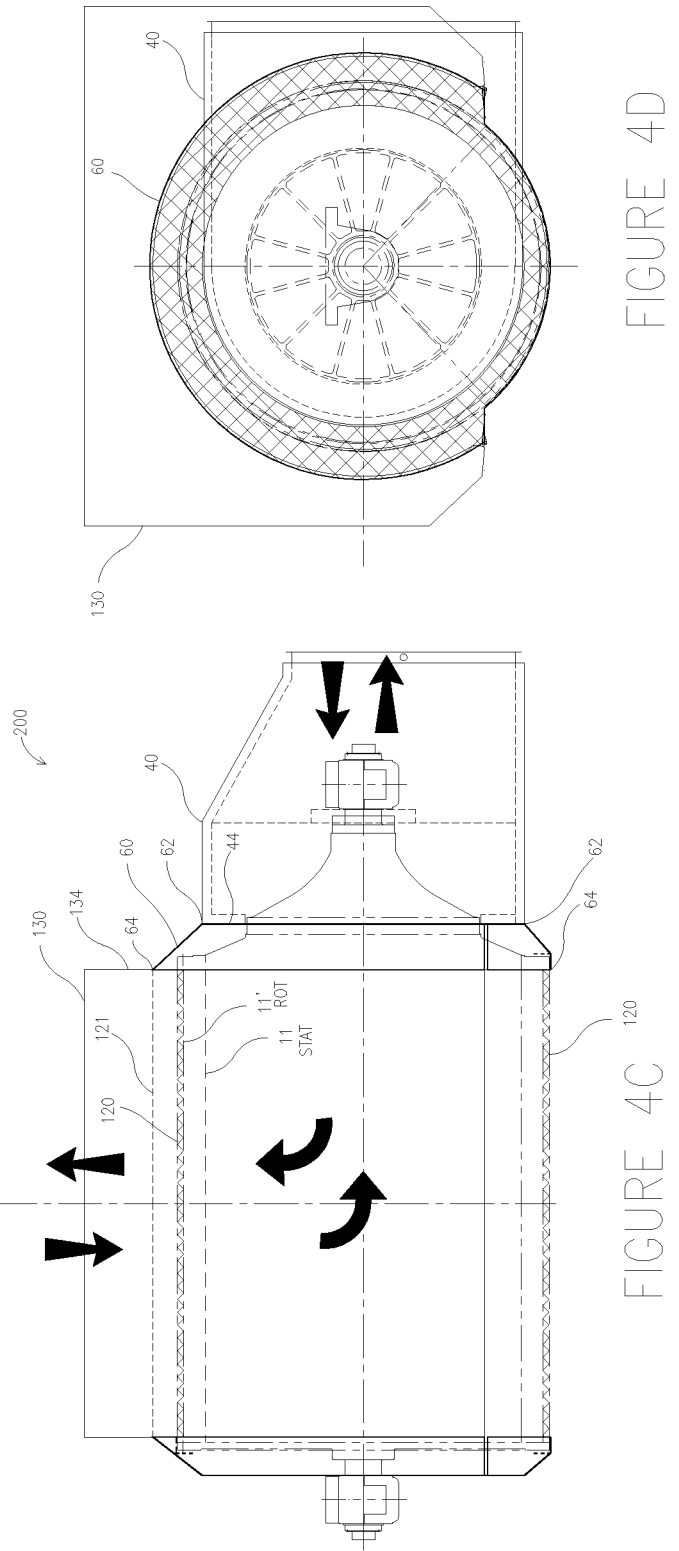

FIGS. 4A-4H illustrates various embodiments of a first shroud 60 in greater detail. As shown, in one embodiment, one end of the roll 120 is connected to a motor and drive assembly (i.e., drive side) and the opposite end of the roll 120 may be known as the tend side. FIG. 4A illustrates an end view on the tend side, and FIG. 4D illustrates an end view on the drive side. As shown in FIGS. 4B and 4C, in one embodiment, the first end 62 of the first shroud 60 is configured to align substantially with an outer edge 44 of the exhaust duct. In one embodiment, the exhaust duct 40 has a cylindrical shape, and thus the outer edge 44 of the exhaust duct 40 is substantially circular in shape. Thus, in one embodiment, the first end 62 of the first shroud 60 may also be arched in a substantially circular in shape and/or in a partially substantially circular shape when the first shroud 60 does not extend a full 360° around the through-air roll 120.

As shown in FIGS. 4B and 4C, in one embodiment, the second end 64 of the first shroud 60 is configured to align substantially with an outer edge 134 of the hood 130. One of ordinary skill in the art will recognize that the specific shape and size of the first and second ends 62, 64 of the first shroud 60 may depend upon the shape, size and/or configuration of the exhaust duct 40 and/or the hood 130, and thus the disclosure is not limited in this respect. Although circular cross-section shapes for the shroud 60 are mentioned above, other shapes, such as, but not limited to square, rectangular, oval and irregular shapes are also contemplated.

As shown in FIGS. 4B and 4C, the first shroud 60 may extend substantially between the exhaust duct and the hood to reduce the amount of process air inside of the through-air apparatus that is released out of the apparatus and reduce the amount of air outside of the apparatus that leaks into the through-air apparatus. As shown in FIGS. 4B and 4C, in one embodiment, the first end 62 of the first shroud directly contacts the exhaust duct 40 and the second end 64 of the first shroud 60 directly contacts the hood 130, so that air cannot enter or exit the through-air apparatus at this location.

In another embodiment, it is contemplated that the first shroud 60 is attached and/or fixed to the exhaust duct 40 and/or the hood 130 with a mechanical connection such as, but not limited to rivets, welding, screws, etc. FIGS. 4B and 4C are substantially similar to each other except that the embodiment shown in FIG. 4B illustrates a shroud 60 with plurality of expansion joints to permit thermal expansion of the exhaust duct 40 and hood 130, whereas the embodiment in FIG. 4C does not include an expansion joint in the should 60.

As shown in FIG. 3A, in one embodiment, the through-air apparatus 200 has a first shroud 60 positioned on a first end 126 of the through-air roll 120, and a second shroud 70 positioned on a second end 128 of the through-air roll 120. As shown, in this embodiment, at least a portion of the exhaust duct 40' and the hood 130 are positioned adjacent a second end 128 of the through-air roll 120. As shown, the second shroud 70 extends substantially from the exhaust duct 40' to the hood 130, and the second shroud is configured to reduce the amount of process air inside of the through-air apparatus 200 that is released out of the through-air apparatus and reduce the amount of air outside of the apparatus that leaks into the through-air apparatus. As shown in FIG. 3A, in one embodiment, the second shroud 70 has a substantially truncated cone shape, with a smaller first end 72 of the second shroud 70 adjacent the exhaust duct 40' and a larger second end 74 adjacent the hood 130. In one embodiment, the second shroud 70 may be configured to extend radially about at least the active arc length of the through-air roll 120. This feature is illustrated in the end view shown in FIG. 3B, in which the second shroud 70 extend radially about the active arc length of the through-air roll 120. It should be appreciated that the exhaust duct 40' may be part of exhaust duct 40 and/or it is also contemplated that they are separate exhaust ducts 40, 40' as the disclosure is not limited in this respect.

As set forth in more detail below, in another embodiment, the hood 130 defines an inactive arc length of the through-air roll 120 positioned outside of the hood, and the first shroud 60 may extend radially about at least the inactive arc length of the first end 126 of the through-air roll 120. Similarly, in one embodiment, the second shroud 70 may extend radially about at least the inactive arc length of the second end 128 of the through-air roll 120. More details about the first and second shrouds 60, 70 extending radially about an inactive arc length of the through-air roll 120 (i.e., inactive zone of the apparatus) is discussed in more detail below.

As shown in FIG. 3A, in one embodiment, the through-air apparatus 200 includes a third shroud 80. In this particular embodiment, the apparatus 200 includes a first stationary bearing 202 adjacent the first end 126 of the through-air roll 120, and the third shroud 80 extends substantially between the exhaust duct 40 and the first stationary bearing 202 where the third shroud 80 is configured to reduce the amount of process air inside of the through-air apparatus 200 that is released out of the through-air apparatus and reduce the amount of air outside of the apparatus 200 that leaks into the through-air apparatus. In one illustrative embodiment, the third shroud 80 has a substantially toroid shape, with a first end 82 of the third shroud 80 adjacent to the exhaust duct 40, and a second end 84 of the third shroud 80 adjacent to the first stationary bearing 202. In another embodiment, the third shroud 80 may have a semicircular donut shape. Other shroud shapes and configurations are discussed in more detail below.

Furthermore, in one embodiment as shown in FIG. 3A, the through-air apparatus 200 includes a fourth shroud 90. In this particular embodiment, the apparatus 200 includes a second stationary bearing 204 adjacent the second end 128 of the through-air roll 120, and the fourth shroud 90 extends substantially between the exhaust duct 40 and the second stationary bearing 204 where the fourth shroud 90 is configured to reduce the amount of process air inside of the through-air apparatus 200 that is released out of the through-air apparatus and reduce the amount of air outside of the apparatus 200 that leaks into the through-air apparatus. In one illustrative embodiment, the fourth shroud 90 has a substantially toroid shape, with a first end 92 of the fourth shroud 90 adjacent to the exhaust duct 40', and a second end 94 of the fourth shroud 90 adjacent to the second stationary bearing 204. Other shroud shapes and configurations are discussed in more detail below. As shown in FIGS. 3A and 3B, in one embodiment, the first and third shrouds 60, 80, are connected with a channel/passage 210 allowing for air to be supplied or drawn, and similarly, the second and fourth shrouds 70, 90 are also connected with a channel/passage 210' allowing for air to be supplied or drawn. The channels/passages 210, 210' are discussed in more detail below.

In one embodiment, the exhaust duct 40 and the hood 130 are configured to be stationary relative to the rotating through-air roll 120. The through-air roll 120 may thus rotate relative to these stationary components in an operating condition. One of ordinary skill in the art would recognize that the exhaust duct 40 and hood 130 and its associated sealing elements 42, 132 (shown in the detailed views of FIGS. 5 and 6) may be made of various materials such as, but not limited to, Teflon, metal, and plastic. In one embodiment, the sealing elements may be detachable from the exhaust duct 40 and the hood 130, while in another embodiment, one or more sealing elements may be integrally formed with the exhaust duct 40 or the hood 130. As set forth in more detail below, in one embodiment, the sealing elements 42, 132 are terminus locations and/or edges of the exhaust duct 40 and hood 130. In one embodiment, the exhaust duct 40 and hood 130 may be configured to be substantially stationary in an operating condition of the through-air apparatus, but one or both of the exhaust duct 40 and hood 130 may be configured to retractable and/or moveable in a non-operating condition for example for maintenance purposes and/or to more readily access certain components of the through-air apparatus.

In one embodiment, the first and/or second shroud 60, 70 may be removable and/or retractable relative to the exhaust duct 40 and/or the hood 130. For example, there may be times when it is beneficial to remove and/or retract entire or portion of the shroud 60, 70 to more readily access the inside of the through-air apparatus. It should be appreciated that in another embodiment, the first and/or second shroud 60, 70 may be fixed to the exhaust duct 40 and/or the hood 130 and not designed to be removed and/or may be fully or partially retracted.

In one embodiment, the first and/or second shroud 60, 70 may be made of a flexible material to permit thermal expansion of the exhaust duct 40 and the hood 130 during operation of the through-air apparatus. Various flexible shroud materials include but are not limited to expansions joints, with or without liners/reinforcing elements, overlap joints, or any other joints that allow for movement in one plane or both planes. For example, as shown in FIGS. 4B, 4E and 4G, the shroud 60 may include one or more expansion joints, represented by the wavy lines. In FIGS. 4B and 4C, the shroud 60 has a substantially truncated cone shape. In contrast, in the embodiment shown in FIGS. 4E and 4F, the shroud 60 has a rectangular cross-sectional shape, and in the embodiment shown in FIGS. 4G and 4H, the shroud 60 has a flat plate-like cross-sectional shape. As shown, an expansion joint may be located in the horizontal plane, in the vertical plane, or in both the horizontal and vertical planes.

Furthermore, in another embodiment, it is contemplated that the first and/or second shroud 60, 70 may be retractable/slidable with spring-loaded components and/or may incorporate labyrinth seals to further assist the thermal efficiency of the apparatus. In one embodiment, the first and/or second shroud 60, 70 may be made of telescoping materials that may overlap.

As shown in FIG. 4, the through-air roll 120 may include a perforated plate 11. One of ordinary skill in the art will appreciate that, like the through-air roll 120, the roll perforated plate 11 may have a substantially cylindrical shape, and the perforated plate 11 may include a plurality of openings therethrough to provide the desired air flow characteristics through the through-air roll 120. As shown by the arrows, in one embodiment, process air flows inside of the hood 130 from outside of the through-air roll 120, through to the center of the through-air roll 120 and then out through the exhaust duct 40. In one embodiment, the roll perforated plate 11 may be stationary relative to the rotating though-air roll 120 but in another embodiment, it is contemplated that the roll perforated plate 11 is coupled to and configured to rotate with the through-air roll 120 as the disclosure is not so limited.

Figure 5:
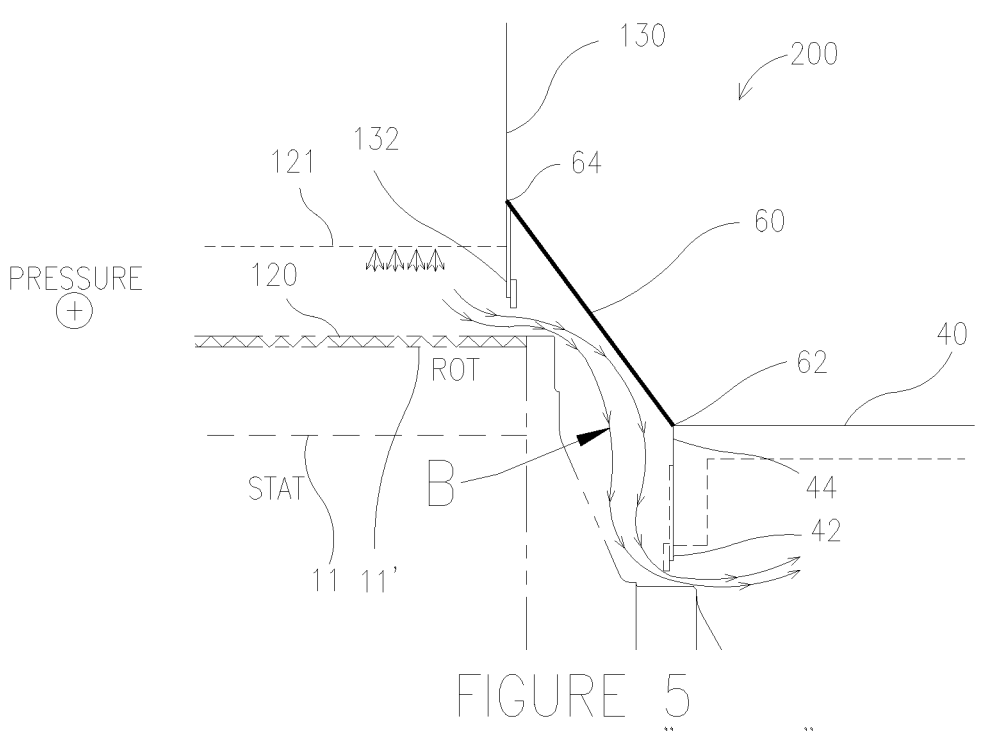
FIG. 5 is a detailed cross-sectional view of a through-air apparatus according to one embodiment.

As shown by arrow B in the detailed view of FIG. 5, in one embodiment, the first shroud 60 is positioned such that process air may flow through the hood perforated plate 121 bypassing the through-air roll 120 and the roll perforated plate 11, travelling along the length of the first shroud 60 and out the exhaust duct 40. One can appreciate that the first shroud 60 acts to divert the process air to reduce the amount of process air inside of the apparatus that is released out of the apparatus while also reducing the amount of outside air that leaks into the apparatus.

The embodiment shown in FIG. 5 illustrates that the exhaust duct sealing element 42 may be at the terminus location and/or edge of the exhaust duct 40. Similarly, FIG. 5 also illustrates that the hood sealing element 132 may be at the terminus location and/or edge of the hood 130. As shown by the arrows B in FIG. 5, the shroud 60 may be configured such that the process air is directed around both the sealing elements 42, 132.

Figure 6:
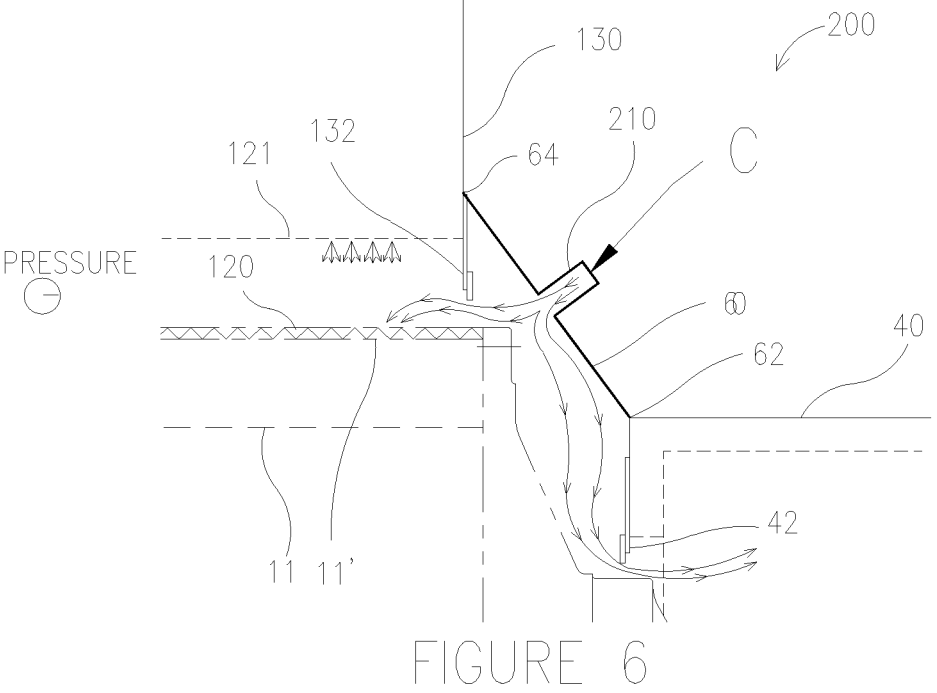
FIG. 6 is a detailed cross-sectional view of a through-air apparatus according to another embodiment.

As shown in FIG. 6, in one embodiment, the first shroud 60 may include at least one channel (i.e., passage) 210 configured to direct air into the through-air apparatus. As shown by arrows C in FIG. 6, the channel 210 may be configured to recirculate system air from another portion of the through-air apparatus into the through-air apparatus. As shown by arrows C, air may pass through the first shroud 60 through channel 210 and the air may circulate towards the through-air roll 120 and then into the exhaust duct 40. Further details regarding the channel 210 are described in more detail below. As shown by the arrows C in FIG. 6, the shroud 60 may be configured such that the process air is directed around both the sealing elements 42, 132.

As set forth in more detail below, aspects of the present disclosure include where the first shroud 60 and or second shroud 70 have at least one channel 210 configured to direct air into the through-air apparatus. As set forth below, the air may be directed through the shroud 60, 70 to a hood sealing element and/or an exhaust duct sealing element to reduce the infiltration of ambient air into the through-air apparatus. As discussed below, the air which is directed through the channel 210 may be sourced from a variety of locations, including, but not limited to, recirculating the system air from another portion of the through-air apparatus system. In one embodiment, the air is sourced from the exhaust line of the through-air apparatus. Other air sources are also contemplated and are discussed below. For example, both heated and non-heated air sources not specifically within the through-air apparatus system may also be employed. As set forth below, at least one channel 210 may be provided in the shroud(s) 60, 70 to direct this air to the hood sealing element 132 and/or the exhaust sealing element 42.

Figure 14:
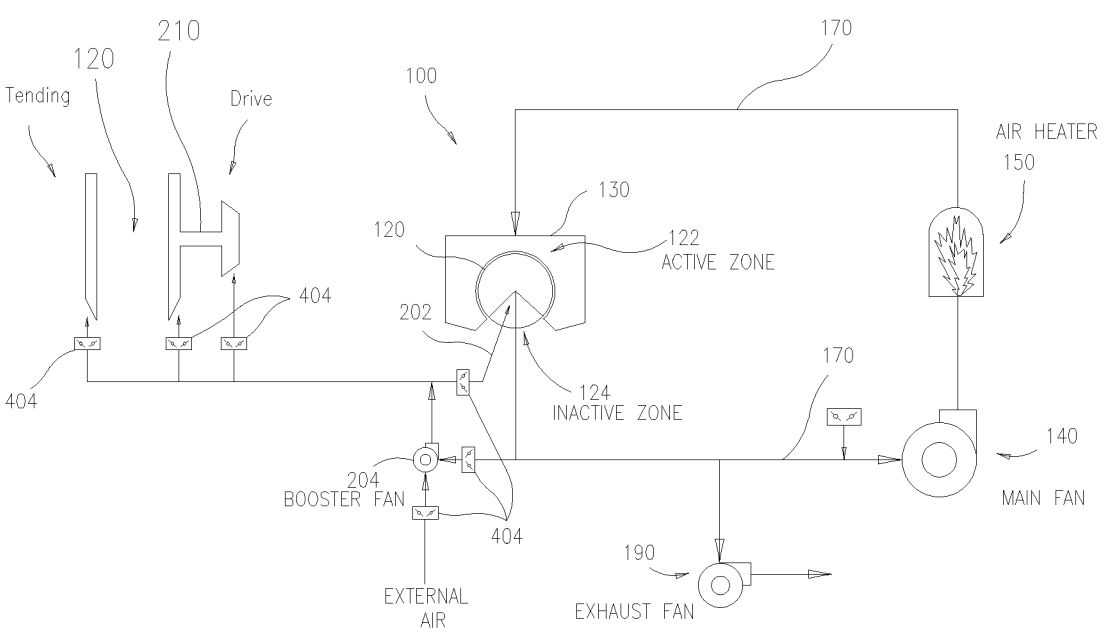
FIG. 14 is a schematic diagram of a through-air apparatus system according to one embodiment with recirculation of air from within the apparatus.
Figure 15:
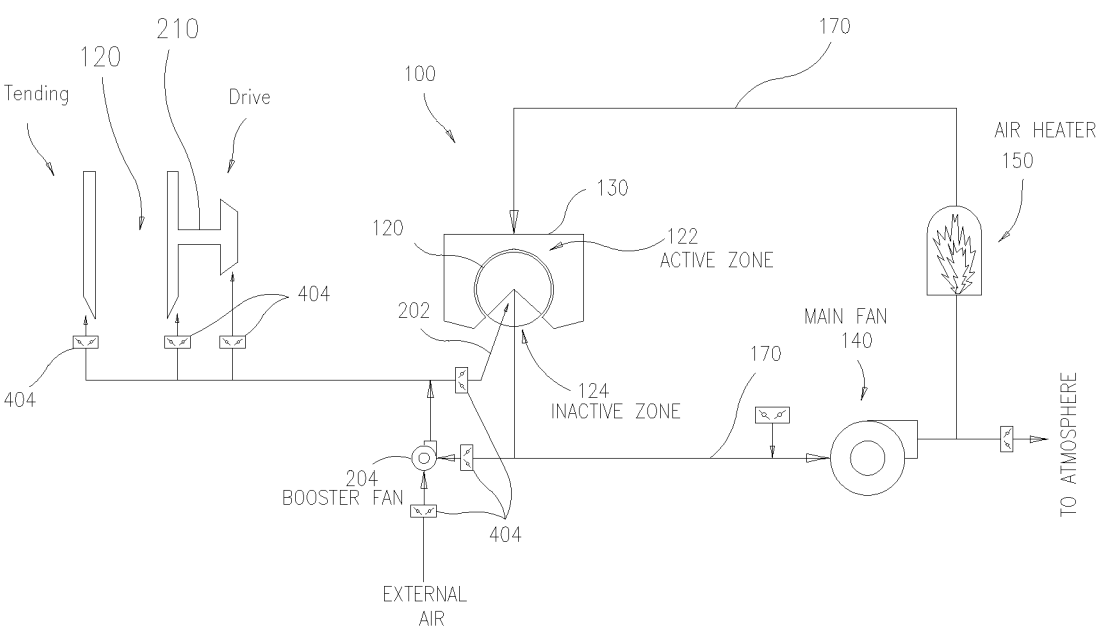
FIG. 15 is another schematic diagram of a through-air apparatus system according to one embodiment without an exhaust fan.

In one embodiment, the shroud 60 includes a valve configured to selectively close the first channel 210. Various types of valves including, but not limited to, gate valves may be utilized as the disclosure is not so limited. As set forth in more detail below, the air flow through the channel 210 may be controlled through the adjustment of fan speeds, damper positions, or variable flow restrictions within the channel, or other means to allow for even distribution of the air through the channel 210. As discussed in more detail below, in one embodiment as shown in FIGS. 14-15, various flow control devices 404, such as valves, dampers, etc. may be positioned within the through-air apparatus system to selectively close a channel 210.

The inventors contemplate that the present disclosure may have a variety of advantages. First, the concepts of the present disclosure may be employed to increase the energy efficiency of a through-air apparatus by recycling exhaust air, minimizing heat loss within, and/or reducing the infiltration of ambient air into the through-air apparatus. Second, the concepts discussed therein may be used to help regulate and/or control the system air humidity levels within the through-air apparatus. Third, the concepts of the present disclosure may enable larger gaps/spaces between the sealing elements and the web-carrying structure in comparison to a traditional through-air apparatus.

The general concept of including a channel in a through-air apparatus configured to direct air into the through-air apparatus is disclosed in Applicant's earlier filed patent application, U.S. Pat. Ser. No. 17/335,365 filed Jun. 1, 2021, the contents of which are hereby incorporated by reference in its entirety. The present disclosure builds upon this earlier filed patent application and this concept is discussed in more detail below.

Figure 7:
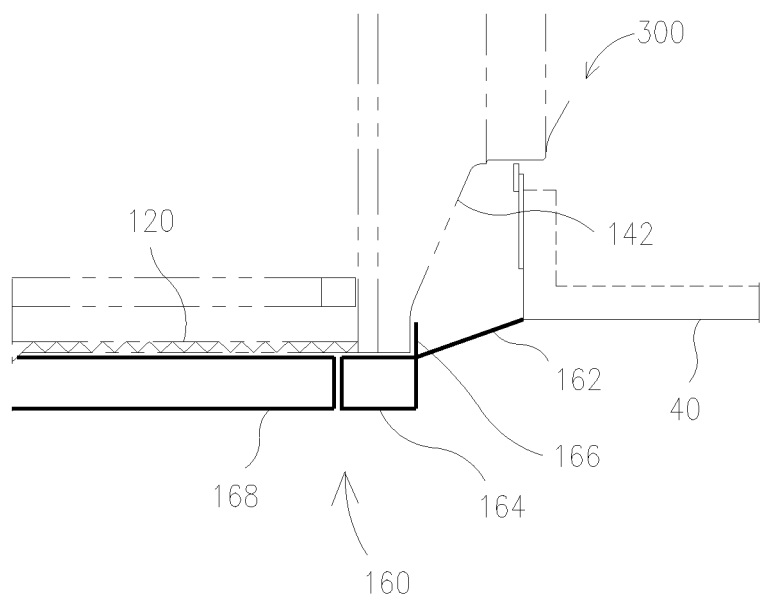
FIG. 7 is a detailed cross-sectional view of a through-air apparatus according to another embodiment.
Figure 8:
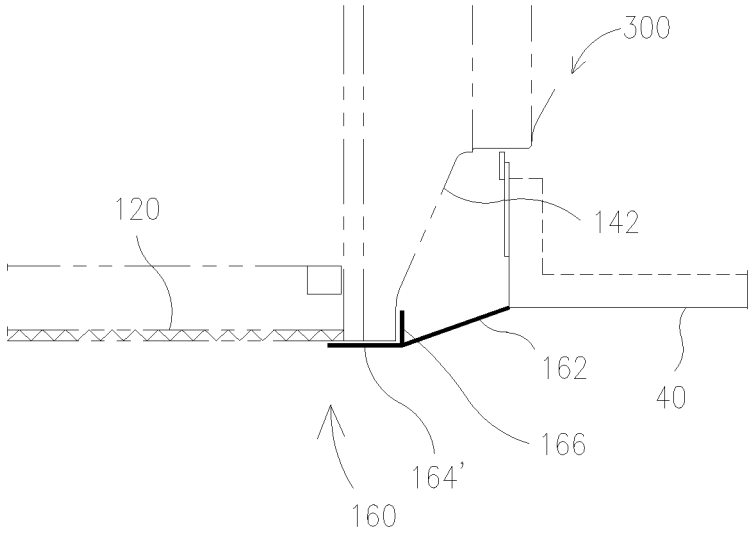
FIG. 8 is a detailed cross-sectional view of a through-air apparatus according to another embodiment.

Turning now to FIGS. 7 and 8, another embodiment of a through-air apparatus 300 having at least a first shroud 162—extending substantially from the exhaust duct 40 to the roll dead zone (inactive arc/area/zone 124) will now be described. As mentioned above, in one embodiment, the first shroud 60 extends radially about at least the active arc length of the through-air roll 120. As described in more detail below, in another embodiment, the portion of the through-air roll 120 positioned outside of the hood 130 defines an inactive arc length, and the first shroud 160 extends radially about both the active arc length and the inactive arc length of the drive side of the through-air roll 120.

FIG. 7 illustrates one embodiment of the cross-section of the first shroud 160 in the dead zone at the exhaust duct 40 specifically at the hood entrance and hood exit. As mentioned above and as shown in FIG. 1, when the through-air roll 120 is configured to rotate in a clockwise direction, the hood entrance may be defined at 134 and the hood exit may be defined at 136. As shown in FIG. 7, the first shroud 160 may include a first section 162 extending adjacent the exhaust duct 40, and a second section 164 adjacent the hood 130. In one embodiment, the first shroud 160 includes a rib 166 which is configured to radially seal a component of the through-air apparatus, such as the roll head 142. In one embodiment, the first shroud 160 further includes a third section 168 positioned adjacent the through-air roll 120. In one embodiment the second and third sections 164, 168 of the first shroud 160 act as a hood sealing element and the upper surface of the second section 164 is configured to axially seal the dead zone with the roll head 142. The present disclosure contemplates that in one embodiment, the second and/or third sections 164, 168 of the first shroud 160 may be moveable and/or pivotable/slidable relative to a stationary first section 162 of the first shroud 160. As mentioned above, the shroud 160 may be removable and/or retractable relative to the exhaust duct 40 and/or the hood 130 to more readily access the inside of the through-air apparatus.

As mentioned above, the specific shape and configuration of the shroud 160 may vary according to different embodiments. As shown in FIG. 7, in one embodiment, the shroud 160 includes a first section 162 which may have a substantially truncated cone shape with a smaller end adjacent the exhaust duct 40 and the larger end adjacent the hood 130. As shown in FIG. 7, the shroud 160 includes a second section 164 having a substantially rectangular cross-sectional shape. In one embodiment, the shroud 160 further includes a third section adjacent 168 the second section 164 having a substantially rectangular cross-sectional shape.

FIG. 8 is like the detailed view shown in FIG. 7 except that FIG. 8 illustrates the cross-sectional shape of one embodiment of the first shroud 160 in the inactive arc length of the through-air roll 120 (i.e., inactive zone or dead zone) at the exhaust duct 40 between the hood entrance 134 and the hood exit 136. As shown in FIG. 8, in the inactive arc length, in one embodiment, the shroud 160 includes a first section 162 which may have a substantially truncated cone shape with a smaller end adjacent the exhaust duct 40 and the larger end adjacent the roll inactive zone/arc 124. As shown in FIG. 8, in this embodiment, the shroud 160 may also include a second section 164' and an upwardly extending rib 166 positioned between the first and second sections 162, 164'. This configuration may be desirable as the rib 166 helps to radially seal the dead zone with the roll head 142, and the second section 164' axially seals the dead zone with the roll head 142.

As shown in FIGS. 5-8, in one embodiment, the first shroud 60, 160 may have a first cross-sectional shape in the active arc length (see for example, FIGS. 5 and 6), and the first shroud 60, 160 may have a second cross-sectional shape in the inactive arc length (see for example, FIG. 8), where the first cross-sectional shape is different than the second cross-sectional shape. As shown in FIG. 7, the first shroud 60, 160 may also have a third cross-sectional shape at the hood entrance 134 and hood exit 136 (hood entrance 134 and hood exit 136 are shown FIG. 1), where the third cross-sectional shape is different from the first of second cross-sectional shape.

Figure 9:
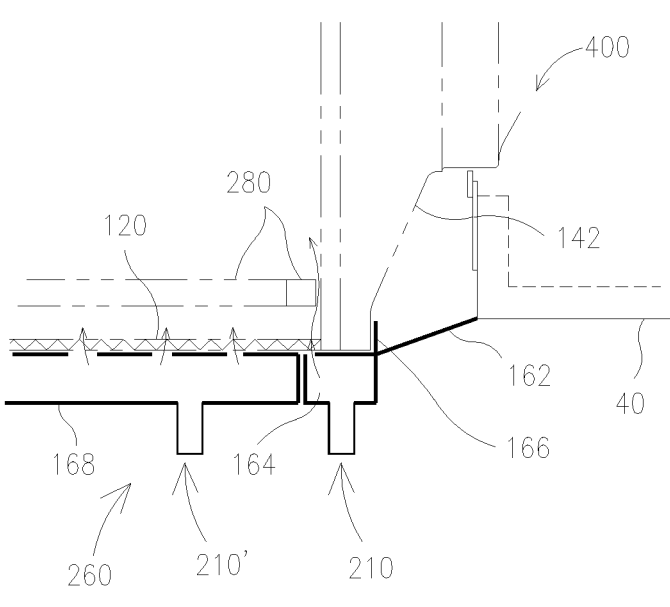
FIG. 9 is a detailed cross-sectional view of a through-air apparatus according to another embodiment.
Figure 10:
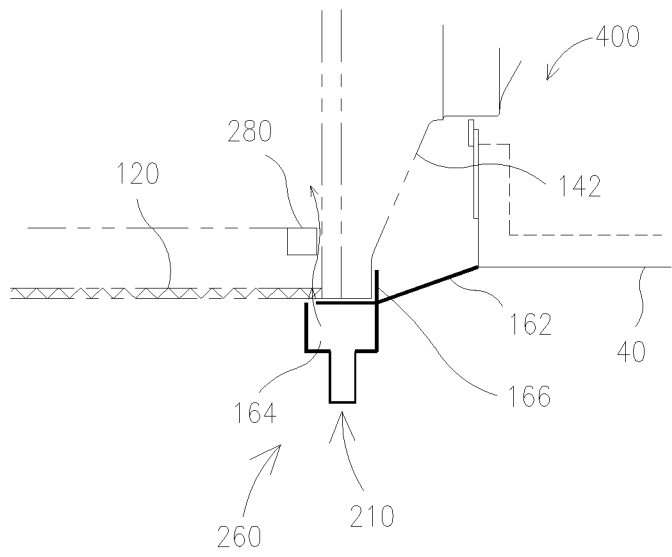
FIG. 10 is a detailed cross-sectional view of a through-air apparatus according to another embodiment.

Turning now to FIGS. 9 and 10, yet another embodiment of a through-air apparatus 400 having at least a first shroud 260 extending substantially from the exhaust duct 40 to the roll inactive arc/zone 124 will now be described. In some respects, the embodiments shown in FIGS. 9 and 10 are like the above-described embodiments shown in FIGS. 7 and 8, and thus like reference numbers have been used. More specifically, FIG. 9 illustrates one embodiment of the cross-section of the first shroud 260 in the dead zone at the exhaust duct 40 at the hood entrance and hood exit and FIG. 10 illustrates the cross-sectional shape of one embodiment of the first shroud 260 in the inactive arc length of the through-air roll 120 (i.e., inactive zone or dead zone) at the exhaust duct 40 between the hood entrance 134 and the hood exit 136.

In contrast to the embodiments shown in FIGS. 7 and 8, the embodiments shown in FIGS. 9 and 10 include a first shroud 260 having at least one channel 210 configured to direct air into the through-air apparatus. As discussed above, FIG. 6 illustrates the first shroud 60 having a channel 210 extending radially about the active arc length of the through-air roll 120. In contrast, FIG. 10 illustrates a first shroud 260 extending radially about the inactive arc length of the through-air roll where there is least one channel 210 in the first shroud 260 configured to direct air into the through-air apparatus, and FIG. 9 illustrates a first shroud 260 with at least one channel 210 in the first shroud 260 configured to direct air into the through-air apparatus extending within the two transitions between the active zone and the inactive zone (i.e. at the hood entrance and the hood exit).

As shown in FIG. 9, the first shroud 260 may include a first section 162 extending adjacent the exhaust duct 40, and a second section 164 adjacent the roll inactive arc/zone 124. In one embodiment, the first shroud 260 includes a rib 166 which is configured to radially seal a component of the through-air apparatus, such as the roll head 142. In one embodiment, the first shroud 260 further includes a third section 168 adjacent the through-air roll 120. In one embodiment the second and third sections 164, 168 of the first shroud 160 act as a hood sealing element and the upper surface of the second section 164 is configured to axially seal the dead zone with the roll head 142. The present disclosure contemplates that in one embodiment, the second and/or third sections 164, 168 of the first shroud 260 may be moveable and/or pivotable/slidable relative to a stationary first section 162 of the first shroud 160. As mentioned above, the shroud 260 may be removable and/or retractable relative to the exhaust duct 40 and/or the hood 130 to more readily access the inside of the through-air apparatus.

Furthermore, as shown in FIG. 9, the first shroud 260 may include at least one channel 210. As shown, in this embodiment, the channel 210 is configured to direct air onto an end dam seal 280 of the through-air roll 120. As shown, in one embodiment, the first shroud 260 includes another channel 210' configured to direct air into the hood 130 of the through-air apparatus. In one embodiment, the one channel 210' is positioned in the third section 168 of the first shroud 260 to direct air into the hood 130, and a second channel 210 is positioned in the second section 164 of the first shroud 260 to direct air onto the end dam seal 280 of the through-air roll 120. In this embodiment, the channels 210, 210' are oriented to direct air in the cross-machine direction (i.e., perpendicular from the axis 20 of rotation of the through-air roll 120). As discussed below, the air, which is directed through the channels 210, 210' may be sourced from a variety of locations, including, but not limited to, recirculating the system air from another portion of the through-air apparatus system.

FIG. 10 illustrates a first shroud 260 extending radially about the inactive arc length of the through-air roll where there is least one channel 210 in the first shroud 260 configured to direct air into the through-air apparatus. In other words, FIG. 10 illustrates the cross-sectional shape of one embodiment of the first shroud 260 in the inactive arc length of the through-air roll 120 (i.e., inactive zone or dead zone) at the exhaust duct 40 between the hood entrance 134 and the hood exit 136. As shown in FIG. 10, in the inactive arc length, in one embodiment, the shroud 260 includes a first section 162 which may have a substantially truncated cone shape with a smaller end adjacent the exhaust duct 40 and the larger end adjacent the hood 130. As shown in FIG. 10, in this embodiment, the shroud 160 may also include a second section 164 and an upwardly extending rib 166 positioned between the first and second sections 162, 164. This configuration may be desirable as the rib 166 helps to radially seal the dead zone with the roll head 142, and the second section 164' axially seals the dead zone with the roll head 142.

Furthermore, as shown in FIG. 10, the first shroud 260 may include at least one channel 210. As shown, in this embodiment, the channel 210 is configured to direct air onto an end dam seal 280 of the through-air roll 120. As discussed below, the air which is directed through the channels 210 may be sourced from a variety of locations, including, but not limited to, recirculating the system air from another portion of the through-air apparatus system.

Figure 11:
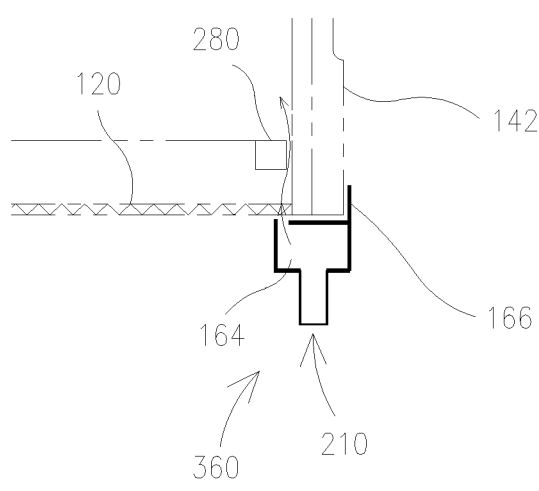
FIG. 11 is a detailed cross-sectional view of a through-air apparatus according to another embodiment.

FIG. 11 illustrates a detailed cross-sectional view of a through-air apparatus according to yet another embodiment. FIG. 11 illustrates a shroud 360 in an embodiment with a single end exhaust duct, where the shroud 360 is on the end of the through-air roll 120 without an exhaust duct. The shroud 360 may extend radially about the inactive arc length of the through-air roll 120. As shown in FIG. 11, the shroud 360 may include a section 164 with an upwardly extending rib 166. This configuration may be desirable as the rib 166 may help to radially seal the dead zone with the roll head 142, and the section 164 may axially seal the dead zone with the roll head 142. As shown in FIG. 11, the shroud 360 also includes at least one channel 210 configured to direct air onto an end dam seal 280 of the through-air roll 120.

Figure 12:
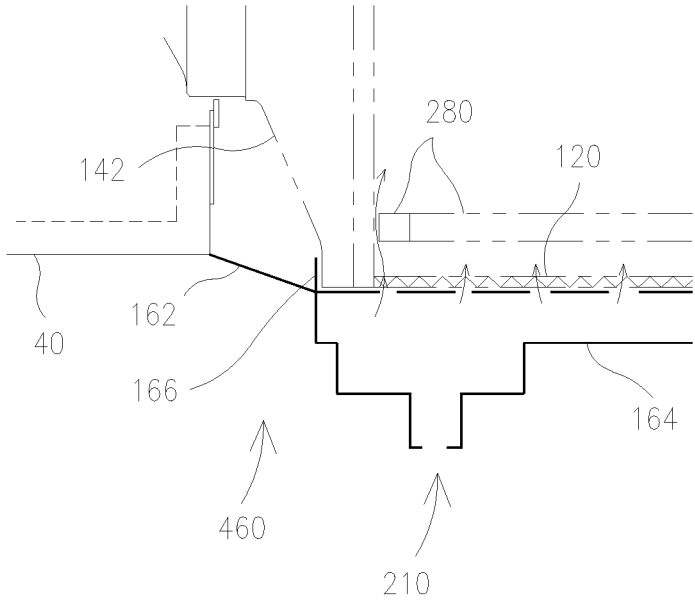
FIG. 12 is a detailed cross-sectional view of a through-air apparatus according to another embodiment.
Figure 13:
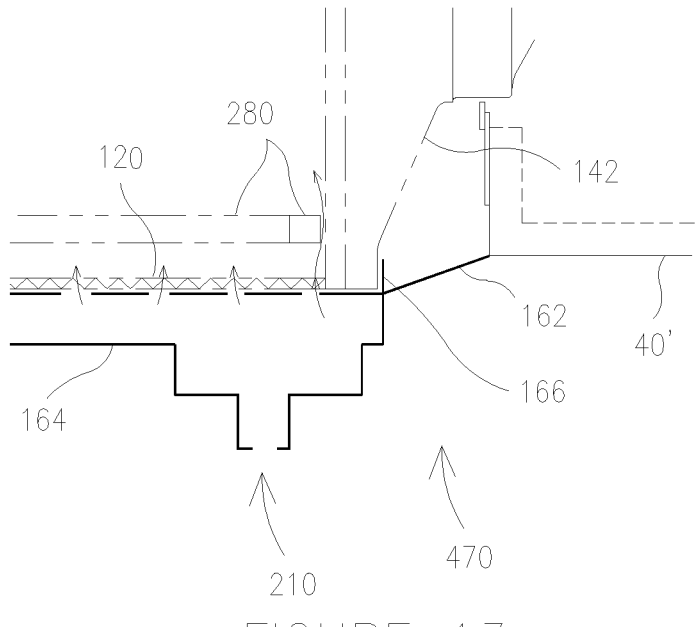
FIG. 13 is a detailed cross-sectional view of a through-air apparatus according to another embodiment.

FIGS. 12 and 13 are detailed cross-sectional view of a through-air apparatus according to another embodiment with a double end exhaust ducts 40, 40'. FIG. 12 illustrates the tending side and FIG. 13 illustrates the drive side which may substantially be mirror images of each other. As shown in FIGS. 12 and 13, at each end of the through-air roll 120 there is a shroud 460, 470. FIGS. 12 and 13 illustrate the cross-sectional shape of one embodiment of a first shroud 460 and a second shroud 470 in the inactive arc length of the through-air roll 120 (i.e., inactive zone or dead zone) at the exhaust duct 40 between the hood entrance 134 and the hood exit 136. As shown in FIGS. 12 and 13, in the inactive arc length, in one embodiment, each shroud 460, 470 includes a first section 162 which may have a substantially truncated cone shape with a smaller end adjacent the exhaust duct 40 and the larger end adjacent the roll 120. As shown in FIGS. 12 and 13, the shrouds 460, 470 may also include a second section 164 and an upwardly extending rib 166 positioned between the first and second sections 162, 164. This configuration may be desirable as the rib 166 helps to radially seal the dead zone with the roll head 142, and the second section 164 axially seals the dead zone with the roll head 142. As shown, each shroud 460, 470 may include at least one channel 210 configured to direct air onto an end dam seal 280 of the through-air roll 120.

As outlined above, the present disclosure contemplates various embodiments which include one or more shrouds extending between the exhaust duct 40 to the hood 130 and the shroud(s) may include one or more channels 210 configured to direct air into the through-air apparatus. FIG. 14 is a schematic diagram of a through-air apparatus system according to one embodiment where the recirculation of air from within the apparatus 200 is used to direct air through the channel(s) 210.

FIG. 14 illustrates a schematic diagram of one embodiment of a through-air apparatus system where heated air is delivered to the channel 210 via a booster fan 204 and conduit line 202. Like FIG. 1, the through-air apparatus 100 includes a though-air roll 120 that is configured to rotate within a hood 130. As shown, a main fan 140 directs system air into the through-air apparatus 100 through conduit 170 and an air heater 150 may be employed to direct heated air into the through-air apparatus 100. Furthermore, an exhaust fan 190 may be used to draw air out of the apparatus 100. In another embodiment, a booster fan 204 may not be required and the conduit line 202 may be positioned downstream of the exhaust fan 190, so that the exhaust fan 190 can be used to direct the air into the conduit line 202 and through the channel 210.

Figure 16:
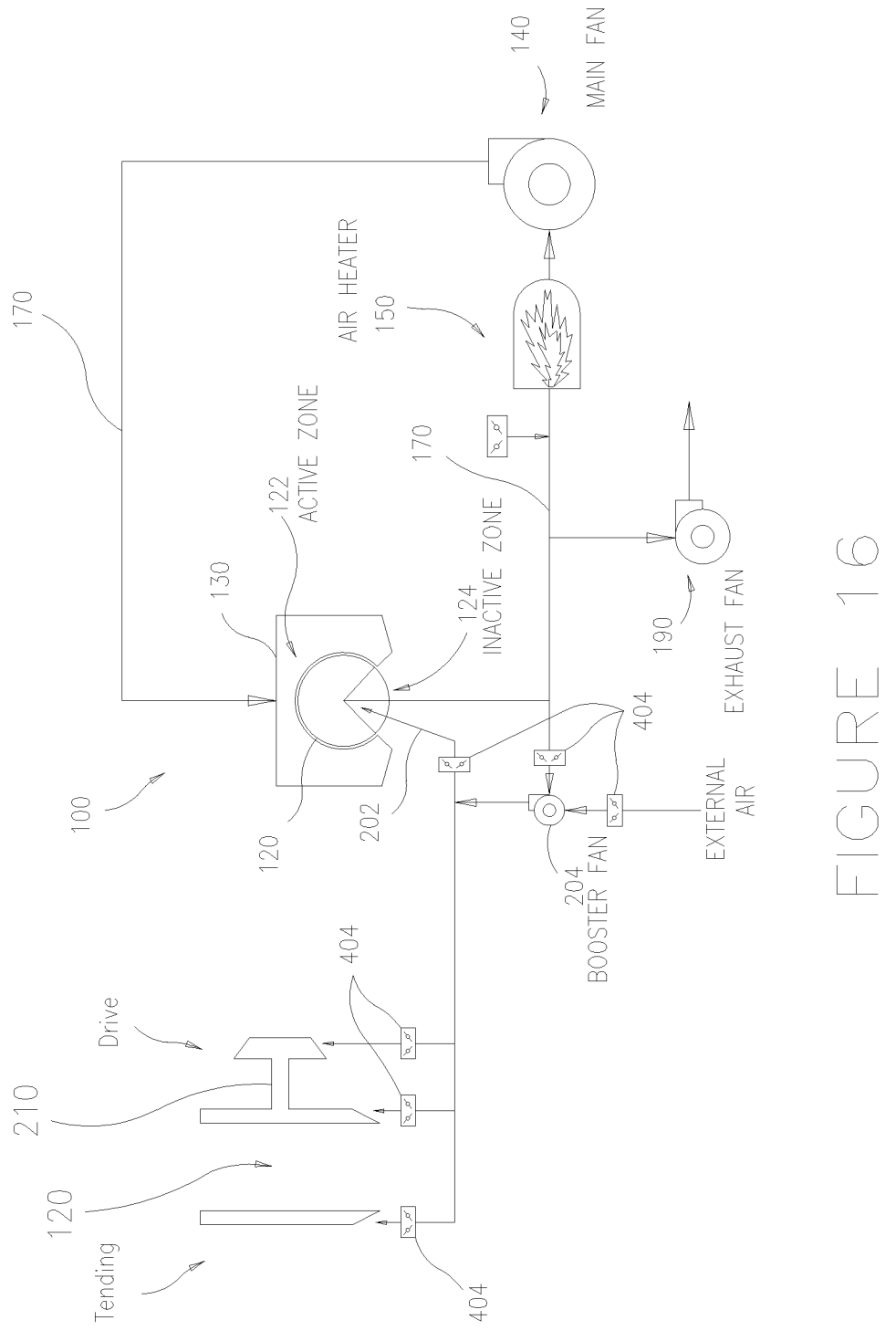
FIG. 16 is another schematic diagram of a through air apparatus system according to one embodiment with the air heater/burner positioned before the main fan.

FIG. 15 illustrates another schematic diagram of a through-air apparatus system according to another embodiment. The embodiment shown in FIG. 15 is similar to that shown in FIG. 14 but without an exhaust fan 190. One of ordinary skill in the art would appreciate that the particular configuration of the through-air apparatus system may vary as the present disclosure is not limited in this respect. It should be appreciated that FIGS. 14 and 15 depict configurations of the air system known as the burner after the main fan. As shown in FIG. 16, in another embodiment, a similar configuration may be provided which is designed with a burner located before the main fan. As shown, in the embodiment disclosed in FIG. 16, the burner/air heater 150 is positioned just before/upstream of the main fan 140. In contrast, in the embodiments disclosed in FIGS. 14 and 15, the burner/air heater 150 is positioned after/downstream of the main fan 140.

The present disclosure also contemplates configurations where the air that is directed to the channel 210 is not sourced specifically from the exhaust line. For example, in one embodiment, the air that is directed to the channel 210 is delivered via the main fan 140. In one embodiment, the conduit 202 may include one or more flow control devices 404, such as dampers or valves, to control the amount of air that flows to the sealing element, which may enable one to control/regulate humidity levels of the system air.

In another embodiment, air is delivered to the channel 210 via a heated air source, which may be located outside of the system air of the through-air apparatus system. Non-heated heat sources are also contemplated as the disclosure is not so limited. For example, in one embodiment, the air source may include pre-heated ambient air, other heated air streams in a paper machine or mill environment, or any other hot air source. Other embodiments may include non-heated air sources, as the present disclosure is not limited in this respect.

The present disclosure contemplates various configurations where air is obtained from different sources (both within the through-air apparatus system and from external sources outside of the system air of the through-air apparatus system), and the air is then directed into the through-air apparatus through the channel 210.

Furthermore, one of ordinary skill in the art would recognize that in one embodiment, the above-described through-air apparatus may be used on a through-air dryer, and in another embodiment, the above-described through-air apparatus may be used on a through-air bonder, as the disclosure is not so limited.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A through-air apparatus for drying or bonding paper, tissue, or nonwoven webs, the apparatus comprising:
   a through-air roll configured for rotational movement about a first axis, the through-air roll having a first end and a second end;
   an exhaust duct adjacent to the first end of the through-air roll;
   a hood encompassing a portion of the through-air roll, wherein the hood defines an active arc length of the through-air roll positioned inside of the hood; and
   a first shroud extending substantially from the exhaust duct to the hood, the first shroud configured to reduce the amount of process air inside of the through-air apparatus that is released out of the through-air apparatus and reduce the amount of air outside of the apparatus that leaks into the through-air apparatus.

2. The apparatus of claim 1, wherein the exhaust duct and the hood are configured to be stationary.

3. The apparatus of claim 1, wherein the first shroud has a substantially truncated cone shape, with a smaller first end of the first shroud adjacent to the exhaust duct, and a larger second end of the first shroud adjacent to the hood.

4. The apparatus of claim 1, wherein the first shroud extends radially about at least the active arc length of the first end of the through-air roll.

5. The apparatus of claim 1, wherein the hood defines an inactive arc length of the through-air roll positioned outside of the hood, wherein the first shroud extends radially about at least the inactive arc length of the first end of the through-air roll.

6. The apparatus of claim 1, wherein the through-air apparatus includes an active zone and an inactive zone, and wherein the first shroud extends radially about the first end of the through-air roll in the active zone of the through-air apparatus.

7. The apparatus of claim 1, wherein at least a portion of the exhaust duct and the hood are both adjacent to the second end of the through-air roll, the apparatus further comprising:

a second shroud extending substantially from the exhaust duct to the hood, the second shroud configured to reduce the amount of process air inside of the through-air apparatus that is released out of the through-air apparatus and reduce the amount of air outside of the apparatus that leaks into the through-air apparatus; and wherein the first shroud is positioned on the first end of the through-air roll, and the second shroud is positioned on the second end of the through-air roll.

8. The apparatus of claim 7, further comprising:

a first stationary bearing adjacent the first end of the through-air roll; and a third shroud extending substantially between the exhaust duct and the first stationary bearing, the third shroud configured to reduce the amount of process air inside of the through-air apparatus that is released out of the through-air apparatus and reduce the amount of air outside of the apparatus that leaks into the through-air apparatus.

9. The apparatus of claim 8, wherein the third shroud has a substantially toroid shape, with a first end of the third shroud adjacent to the exhaust duct, and a second end of the third shroud adjacent to the first stationary bearing.

10. The apparatus of claim 8, further comprising:

a second stationary bearing adjacent the second end of the through-air roll;

a fourth shroud extending substantially between the exhaust duct and the second stationary bearing, the fourth shroud configured to reduce the amount of process air inside of the through-air apparatus that is released out of the through-air apparatus and reduce the amount of air outside of the apparatus that leaks into the through-air apparatus; and wherein the third shroud is positioned on the first end of the through-air roll, and the fourth shroud is positioned on the second end of the through-air roll.

11. The apparatus of claim 7, wherein the second shroud has a substantially truncated cone shape, with a smaller first end of the second shroud adjacent to the exhaust duct, and a larger second end of the second shroud adjacent to the hood.

12. The apparatus of claim 7, wherein the second shroud extends radially about at least the active arc length of the second end of the through-air roll.

13. The apparatus of claim 7, wherein the hood defines an inactive arc length of the through-air roll positioned outside of the hood, wherein the second shroud extends radially about at least the inactive arc length of the second end of the through-air roll.

14. The apparatus of claim 7, wherein the through-air apparatus includes an active zone and an inactive zone, and wherein the second shroud extends radially about the second end of the through-air roll in the active zone of the through-air apparatus.

15. The apparatus of claim 10, wherein the fourth shroud has a substantially toroid shape, with a first end of the fourth shroud adjacent to the exhaust duct, and a second end of the fourth shroud adjacent to the second stationary bearing.

16. The apparatus of claim 1, wherein the first shroud comprises at least one channel configured to direct air into the through-air apparatus.

17. The apparatus of claim 16, wherein the at least one channel is configured to recirculate system air from another portion of the through-air apparatus into the through-air apparatus.

18. The apparatus of claim 16, wherein the at least one channel is configured to flow heated air from at least one of a Yankee hot air system exhaust air stream, a vacuum pump exhaust air stream, a turbine exhaust air stream, or any other heated air stream, into the through-air apparatus.

19. The apparatus of claim 16, wherein the air flow through the channel is controlled through the adjustment of fan speeds, damper positions, or variable flow restrictions within the channel, or other means to allow for even distribution of the air through the channel.

20. The apparatus of claim 1, wherein the first shroud is made of a flexible material to permit thermal expansion of the exhaust duct and the hood.

21. The apparatus of claim 1, wherein the first shroud is removable and/or retractable relative to the exhaust duct and/or the hood.

22. The apparatus of claim 1, wherein the hood defines an inactive arc length of the through-air roll positioned outside of the hood, wherein the first shroud extends radially about both the active arc length and the inactive arc length of the first end of the through-air roll.

23. The apparatus of claim 22, wherein the first shroud has a first cross-sectional shape in the active arc length and the first shroud has a second cross-sectional shape in the inactive arc length, wherein the first cross-sectional shape is different than the second cross-sectional shape.

24. The apparatus of claim 23, wherein the hood has a hood entrance and a hood exit, wherein the first shroud has a third cross-sectional shape at the hood entrance and hood exit, wherein the third cross-sectional shape is different than the first or second cross-sectional shape.

25. The apparatus of claim 16, wherein the at least one channel in the first shroud includes a channel configured to direct air onto an end dam seal at the first end of the through-air roll.

26. The apparatus of claim 16, wherein the at least one channel in the first shroud includes a first channel configured to direct air into the hood of the through-air apparatus, and a second channel configured to direct air onto an end dam seal at the first end of the through-air roll.

* * * * *